Patented July 21, 1936

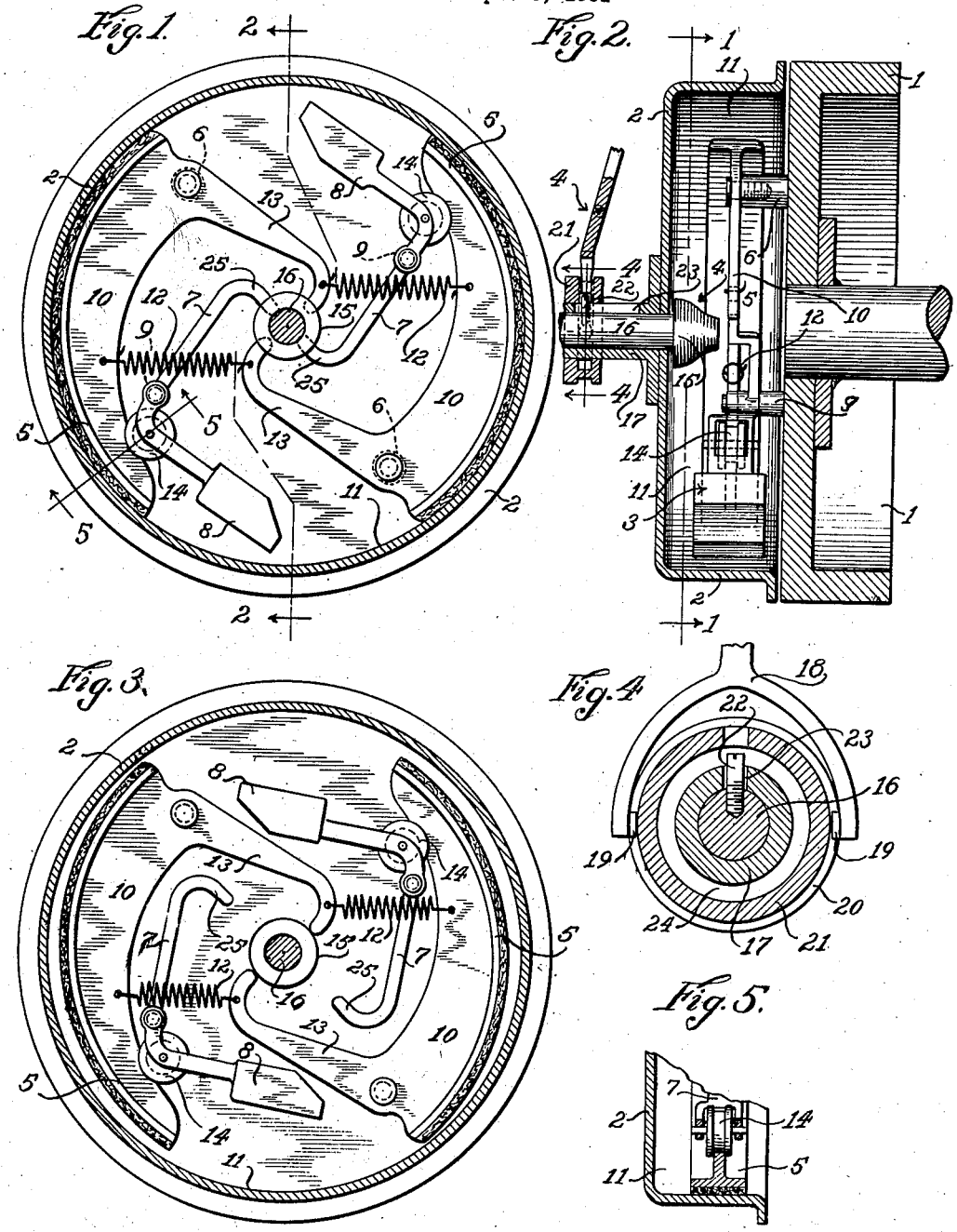

2,048,435

UNITED STATES PATENT OFFICE 2,048,435

CENTRIFUGAL CLUTCH

Adiel Y. Dodge, South Bend, Ind., assignor to Bendix Aviation Corporation, Chicago, Ill., a corporation of Illinois Application September 8, 1931, Serial No. 561,587

6 Claims. (Cl. 192—105)

My invention relates to centrifugal clutches.

One of the objects of my invention is to provide an automatically acting centrifugal clutch mechanism, said mechanism being provided with manually operable means for rendering the same inoperative at the will of the driver.

Further objects will appear from the description and claims.

In the drawing, in which an embodiment of my invention is shown,

Figure 1 is a section on the line 1—1 of Fig. 2;
Fig. 2 is a section on the line 2—2 of Fig. 1;
Fig. 3 is a section on the line 1—1 of Fig. 2, showing the clutch shoes disengaged;
Fig. 4 is a section on the line 4—4 of Fig. 2; and
Fig. 5 is a section on the line 5—5 of Fig. 1.

Referring to the drawing in detail, the construction shown comprises a rotatable member 1, such as the flywheel of an internal combustion engine which normally acts as a driving member, a rotatable driven member 2, which may transmit rotation to the transmission of an automobile, centrifugal force, clutch means 3 rotatable with the driving member whereby the force transmissible increases with the speed of the driving member, and manually controllable means 4 operable against the action of centrifugal force for disconnecting the clutch 3 from the driven member 2 whereby, when the motor is not being called on to supply power for propulsion and it is desired to take advantage of a coasting action, the normally driven member 2 may be disconnected from the normal driving member 1 to permit the normal driving member to slow down to a speed which will render the centrifugal clutch to a speed which will render the centrifugal clutch means 3 ineffective, thus allowing the normally driven member to rotate independently of the normal driving member.

The centrifugal clutch means shown comprise a pair of friction clutch shoes 5 pivotally mounted on lugs 6 on the fly wheel 1 and a pair of levers, having the weighted portions 8 pivotally mounted on the lugs 9 of the fly wheel to increase the centrifugal force acting on the shoes 5 and carrying anti-friction rollers 14 engageable with the ribs 10 on the friction shoes 5. In order to hold the friction shoes 5 out of engagement with the annular friction surface 11 when the motor is running at a low speed, a pair of coil tension springs 12 are provided, connecting the inwardly-extending arms 13 of one shoe with the reinforcing rib 10 of the other shoe.

In order to enable the clutch to be disconnected manually when desired while the driven member 2 is rotating, a conical cam member 15 is provided mounted on a longitudinally adjustable rod 16 which is slidably mounted in the sleeve 17 secured to the driven member 2. This slide rod may be shifted by means of a forked shifting arm 18 having inwardly extending pins 19 lying in an annular groove 20 in the shifting collar 21 which is slidably mounted on the sleeve 17. The shifting collar communicates sliding motion to the slide rod 16 through a pin 22 threaded into the slide rod and operating in a slot 23 in the collar, the outer end of the pin extending into an annular groove 24 in the shifting collar 21.

When conditions are such that it is desired to take advantage of a coasting action of the vehicle, the shifting arm 18 is operated to move the conical cam 15 to the right, as seen in Fig. 2, causing the conical surface of the cam to spread the arms 13 of the friction shoes 5, as seen in Fig. 3, thus causing the shoes to disengage the friction surface 11 and permit the driven member 2 to rotate independently of the normal driving member 1. If the motor is throttled down, the speed of rotation of the driving member 1 will soon decrease to a point at which the centrifugal effect on the friction shoes 5 will be insufficient to overcome the tension in the springs 12. This will render the centrifugal means inoperative, the friction shoes 5 being maintained out of contact with the friction surface regardless of the position of the conical cam 15 which may now be moved back to the position shown in Fig. 2.

When it again becomes necessary for the motor to supply power to the transmission, the motor speed will be accelerated causing the friction shoes 5 to move outwardly under the action of centrifugal force to frictionally engage the annular friction surface 11 and clutch the driven member 2 to the normal driving member 1.

In order to facilitate the manual de-clutching operation the weighted levers also are provided with inwardly-extending arms 25 which are initially engaged by the conical cam 15 when the friction shoes are in engagement with the friction surface so that the conical cam will get action on all four of the pivoted members.

Further modifications will be apparent to those skilled in the art, and I desire, therefore, to be limited only by the prior art and the scope of the appended claims.

Having thus described my invention, what I claim and desire to secure by Letters Patent is:

1. A centrifugal clutch construction comprising a rotatable member normally acting as a driving member, a rotatable member normally acting as a driven member, angularly operable centrifugally operated lever friction members mounted on said driving member and rotatable with said member whereby the power output of the clutch increases with the speed of the driving member, supplemental weighted lever members operatively engageable with said friction members, and means operable against said centrifugally operated friction members and said supplemental weighted members for disconnecting said driving member from the driven member, whereby when the normally driven member is acting as a driving member it may be disconnected from the normal driving member to permit the normal driving member to slow down, lessening the centrifugal force acting on the clutching means.

2. A centrifugal clutch construction comprising a rotatable member normally acting as a driving member, a rotatable member normally acting as a driven member, angularly operable centrifugally operated lever friction members mounted on said driving member and rotatable with said member whereby the power output of the clutch increases with the speed of the driving member, supplemental weighted lever members operatively engageable with said friction members, and means operable against the centrifugally operated friction members and said supplemental weighted members for disconnecting said driving member from the driven member, whereby when the normally driven member is acting as a driving member it may be disconnected from the normal driving member to permit the normal driving member to slow down, lessening the centrifugal force acting on the clutching means.

3. A centrifugal clutch construction comprising a rotatable driving member, angularly operable centrifugally operated friction means mounted on said driving member, weighted centrifugally operable means also mounted on said driving member and contactable with said friction means to supplement the action of the latter, together with manually operable means operable upon both friction means and weighted means to render the friction means and weighted means inoperative for the purpose intended.

4. A centrifugal clutch construction comprising a driven member, a rotatable driving member, centrifugally operated lever friction means fulcrumed on said driving member and adapted to effect a driving contact between said driving and driven clutch members at and above a predetermined R. P. M. of the driving member, together with other centrifugally operated lever means fulcrumed on said driving member and adapted to act on said friction means to force the same into contact with the driven member, and manually operable means adapted to successively cut out the operation of said second-mentioned lever members and friction means.

5. A centrifugal clutch construction comprising a driven member, a rotatable driving member, a plurality of angularly spaced centrifugally operated lever friction members fulcrumed on said driving member, each of said friction members being provided with inwardly extending arms, means contactible with said arms for rendering said friction members inoperative, and a yieldable means interconnecting each of said friction members with the arm of an opposite friction member.

6. A centrifugal clutch construction comprising a driven member, a rotatable driving member, a plurality of angularly spaced centrifugally operated lever friction members fulcrumed on said driving member, each of said friction members being provided with inwardly extending arms, means contactible with said arms for rendering said friction members inoperative, and a yieldable means interconnecting each of said friction members with the arm of an opposite friction member, together with other angularly spaced weighted lever members fulcrumed on said driving member and adapted to contact said friction members to supplement the latter in the operation of the clutch.

ADIEL Y. DODGE.